Figure 1:
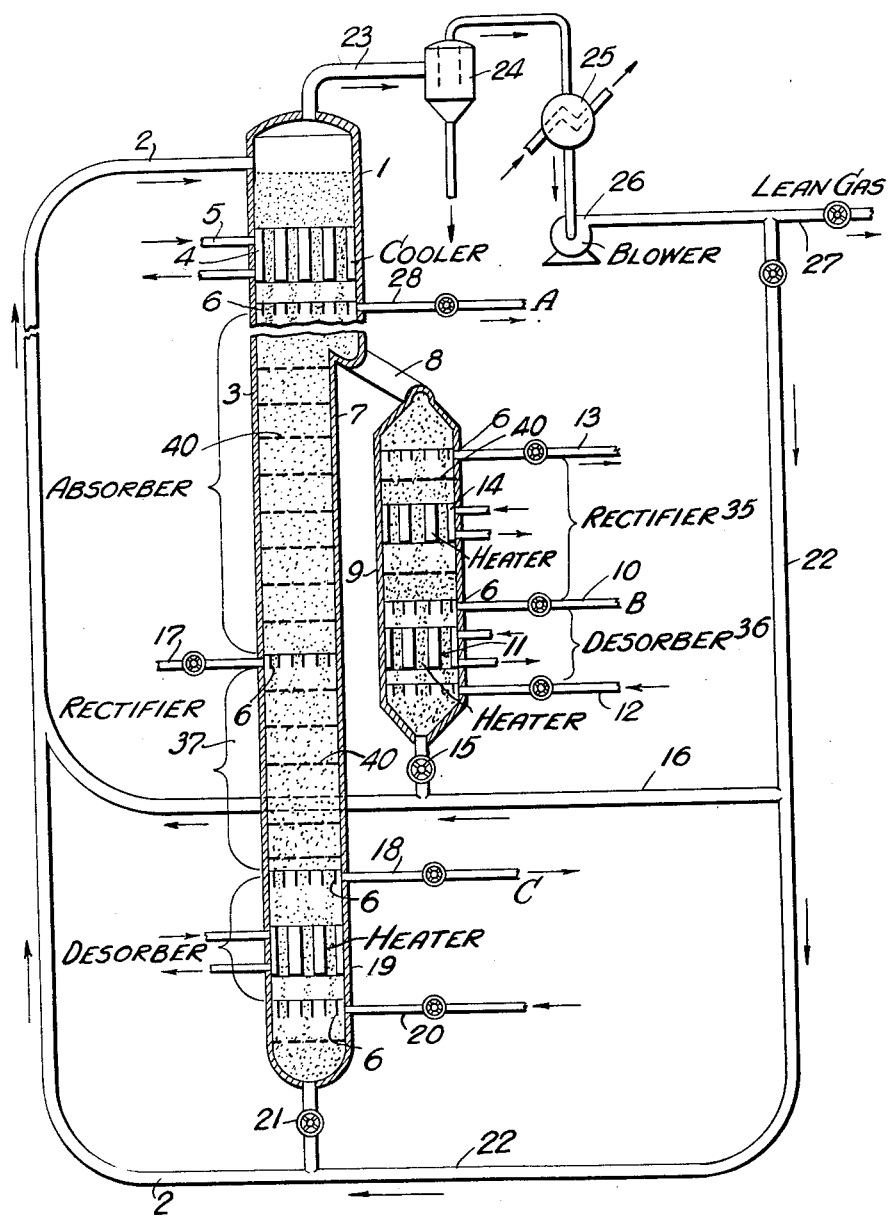

Patented Jan. 31, 1950

2,495,842

UNITED STATES PATENT OFFICE 2,495,842

FRACTIONATION OF GASES WITH SOLID ADSORBENTS

Edwin R. Gilliland, Arlington, Mass., assignor to Standard Oil Development Company, a corporation of Delaware Application January 9, 1947, Serial No. 721,114

17 Claims. (Cl. 183—4.2)

This invention relates to improvements in the art of fractionating mixtures by countercurrent contact of mixed vapors with moving masses of solid adsorbent particles. It applies especially to the fractionation of gaseous or vaporous mixtures of hydrocarbons.

The fractionation of a gaseous mixture by causing it to flow upwardly through an adsorption zone where it contacts an adsorbent material such as silica gel or carbon in small particle or powdered form which is passed downwardly through this zone has been already described. The adsorbent leaving the bottom of the adsorption zone is heated, with or without contact with a stripping gas such as steam, to desorb the adsorbed component of the gas, which is separately recovered. The stripped adsorbent is then cooled and returned to the top of the adsorption zone for re-use.

In such operation the adsorbent can be caused to exercise highly selective action in removing more readily adsorbed materials, such as hydrocarbons of higher boiling point, substantially completely from mixtures containing less readily adsorbed materials, such as similar hydrocarbon homologs of lower boiling point, if suitably extensive countercurrent contact of the gas mixture and solid adsorbent is provided to supply the necessary stages for the removal of the higher boiling hydrocarbon to the extent desired. However, it is difficult to obtain selective desorption of any particular component from the adsorbent. Each adsorbed component exercises its own vapor pressure and the gas composition in contact with the solid adsorbent thus tends to approach an equilibrium concentration for each adsorbed compound. Thus, under adsorption conditions, the solid adsorbent tends to adsorb appreciable quantities of each component present in the gas mixture, and under desorption conditions the adsorbent tends to release appreciable quantities of each compound which has been adsorbed. The lower boiling compounds of any particular chemical series are generally released more readily than the higher boiling compounds but under ordinary conditions, if both types of compounds have been adsorbed, the separation of the more volatile components in a state of high purity becomes very difficult. An even more difficult problem attends the concentration of an intermediate fraction from a mixture containing both more volatile and less volatile homologs.

An object of the present invention is to provide an improved process and apparatus for accompanying such separation of intermediate fractions in a state of high purity by means of a solid adsorbent from mixtures also containing compounds which are less readily adsorbed than the desired intermediate components and also containing compounds which are more readily adsorbed than the desired intermediate components. Another object of this invention is to provide an improved process and apparatus for accomplishing the separation of two or more such intermediate component fractions.

These and other objects of this invention will be apparent from the following description of one method of its application in a process for fractionation of a mixture of hydrocarbon gases by means of granular activated carbon.

Figure 2:
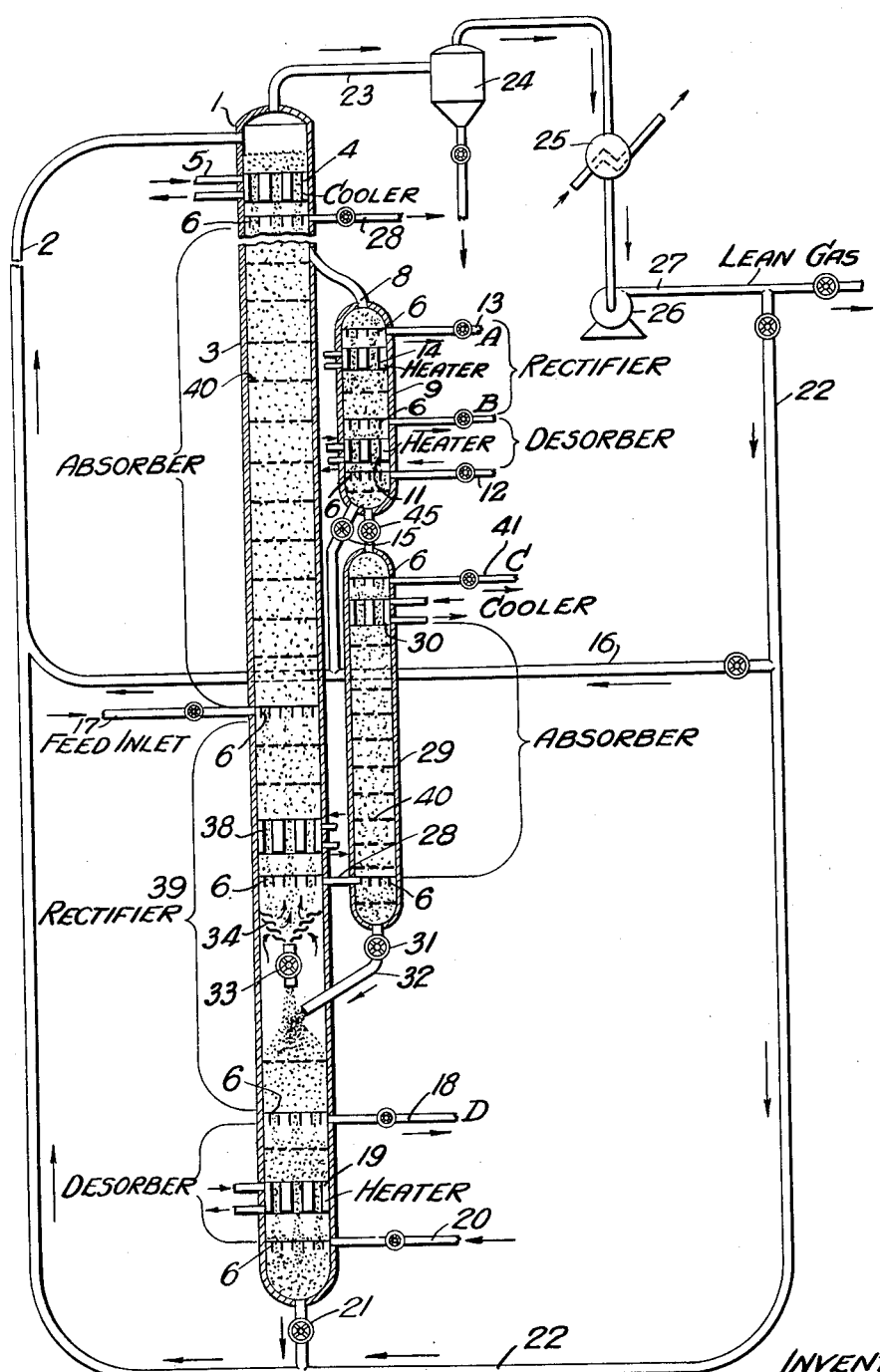

Suitable apparatus for use in this process is shown diagrammatically in the attached drawings. Figure 1 is a view in sectional elevation of an apparatus adapted to separate a single intermediate fraction, while Figure 2 is a similar view of an apparatus adapted to separate two intermediate fractions. Similar numerals refer to similar elements in both views.

Referring to Figure 1 of the drawings a hopper 1 is supplied with a suitable granular adsorbent, for example, with granular activated carbon such as steam activated cocoanut charcoal of a particle size of about 0.1 to 0.01 inch diameter by an adsorbent recycle line 2 which will be discussed below. This hopper supplies a tall cylindrical vessel 3 which is completely filled with the adsorbent. This vessel contains in its upper portion a bundle of vertical parallel cooling tubes 4 open at both ends. A cooling fluid such as water is circulated around the cooling tubes 4 from line 5. The vessel 3 also contains several gas distributing plates or baffles 6. The lower part of the vessel 3 may be of smaller diameter, as indicated at 7 in Figure 1, as it is required to handle a smaller amount of carbon. A portion of the carbon is withdrawn from the upper part of vessel 3 by line 8 and is passed downwardly through a vessel 9 which is provided with a gas drawoff line 10 for removing a middle fraction of the feed mixture. It is also provided with suitable means for desorbing this fraction which may be a complished by heating the descending carbon by passing it through heating tubes 11 or by stripping it with steam or other suitable stripping gas supplied by line 12, or both methods of desorption may be used. The vessel 9 may also be provided, if desired, with an additional gas withdrawal line 13 and an auxiliary heating device 14 in order to aid the rectification and the selective desorption of the lighter components which is accomplished in the upper portion of this vessel above the line 10.

Desorbed carbon is withdrawn from vessel 9 through valve 15. It may be returned to any desired portion of the vessel 7 in the manner described in Figure 2, with or without cooling, and is suitably returned to the adsorption zone above the feed. However, especially if the side stream of carbon in 8 is small compared to that in vessel 7, the carbon from valve 15 is preferably returned to the hopper 1 by suspension in a stream of recycled gas in lines 16 and 2.

The vessel 7 is provided with a feed line 17, a line 18 for the withdrawal of the less volatile or more difficultly desorbed portions of the feed, and with suitable desorption means such as the heating tubes 19 and a line 20 for supplying steam or other suitable stripping gas. It is also supplied with a valve 21 for removal of carbon.

The flow of carbon downwardly through the equipment is controlled by suitable regulation of valves 15 and 21. These determine the relative proportions of carbon which pass through the adsorber 7 and through the vessel 9. These valves should be designed to control the rate of flow of the carbon and may be rotating star valves or reciprocating feeder valves with offset supply and discharge tubes.

The carbon withdrawn through valve 21 is returned to the hopper 1 by any suitable methods, such as by suspension in a stream of inert or recycled unadsorbed gas 22 supplied at a sufficient velocity to provide a dilute suspension of carbon in the resulting gas mixture, this suspension being passed through line 2 into the upper portion of the hopper 1 which is suitably constructed in the form of a separator so that the entrained carbon separates in this hopper and the gas passes out at the top through line 23. Entrained dust or fines are separated from this gas in the separator 24 and the gas may then be cooled if desired in cooler 25. A portion of this gas may be recycled by blower 26 to line 22, the remaining unadsorbed gas being withdrawn through line 27. The unadsorbed components of the feed gas may be passed up through the cooler 4 into the hopper 1 or may be withdrawn through line 28.

In the operation of the equipment illustrated in Figure 1, as will be discussed more fully below, the feed stream enters at line 17, the fraction B of intermediate volatility or ease of adsorption is recovered in concentrated form in line 10, while more volatile and more readily desorbed components are obtained in line 13, if it is desired to use this line, and in line 28. The fraction recoverable in line 13 will be largely free of fixed or substantially unadsorbed gases, while the fraction recovered in line 28 will include such gases. Fractions less volatile and more readily adsorbed than the desired intermediate fraction B are recovered as fraction C in line 18. One or more additional vapor side stream fractions may be withdrawn from the rectification zone at any desired point between the feed line 17 and line 18. While such fraction will be relatively concentrated in comparison with the feed stream, it is often desirable to obtain such fraction in a more highly concentrated, substantially pure form. A suitable method for accomplishing this is shown in Figure 2.

Turning to Figure 2, a gas fraction is withdrawn from the rectification zone of column 3 in line 28 and is passed into the lower portion of an adsorption vessel 29. The upper portion of this vessel is supplied with adsorbent at a suitable temperature from any source. It may, for example, receive a portion of the recycled adsorbent from line 2. However, when the vapor side stream adsorption tower 29 is used in conjunction with a solid side stream desorption tower 9, all or a portion of the solid adsorbent leaving tower 9 may suitably be passed to the adsorber 29, as illustrated. Thus, hot carbon is passed by valve 45 (constructed similarly to valve 15) through cooler 30 and into the adsorber 29, in which it serves to remove heavier or more readily adsorbed fractions than the desired intermediate fraction C from the vapor side stream supplied by line 28. A concentrated intermediate fraction C of high purity is thus obtained in line 41. The carbon leaving the bottom of vessel 29 is charged with both components C and heavier components D and requires desorption before reuse. While such desorption can be carried out in the bottom of vessel 29 below the feed 28, using suitable heating and desorption means such as those illustrated at the bottom of tower 3, such duplication of equipment can be avoided, with increased recovery of the intermediate component C, by returning the charged carbon from vessel 29 to the rectification zone of vessel 3, using valve 31 and line 32. While this could be accomplished by any suitable type of mechanical conveyor, the forcing of the granular carbon through an Archimedian screw or similar device involves some breakage of the particles with the formation of dust or fines. It is preferable to avoid the application to the adsorbent of mechanical compressive or abrasive forces, such as are encountered in the use of force feed devices of this type. The device illustrated in Figure 2 is designed to permit introduction of carbon into the lower portion of vessel 3 from both the upper portion of that vessel and from vessel 29, utilizing only the force of gravity to move the carbon through valves 31 and 33. The latter valve is provided in a constricted portion 34 of the vessel 3 which is perforated or designed in the form of suitable louvers to permit passage of gases upwardly, but to prevent passage of solid downwardly.

The valves 33 and 31 thus control the relative flow of adsorbent through the main adsorption tower 3 and the side stream tower 29, respectively. When using this method of control of the carbon flow, the valve 21 is operated so as to maintain a carbon level below the discharge of line 32 and of valve 33 in order to permit free flow of carbon.

During long continued operation of the equipment involving any of the modifications discussed above, there may be a decrease in activity of the recycled adsorbent, especially if the feed contains sulfur or resin-forming diolefins. In such cases the adsorbent may be regenerated by heating to high temperatures of about 1000–1200° F. in the presence of steam or flue gas either in an intermittent operation or by continuously passing a portion of the recycled adsorbent, as from line 2, through such a regeneration zone.

The flow of the adsorbent downwardly through the equipment has been described above. The fractionation of feed mixtures in conjunction with such operation will now be described. The examples given are merely for purpose of illustration and the invention is not to be limited to the particular operating conditions stated, as these vary with the nature of the feed and the adsorbent.

Referring to Figure 1, a feed gas mixture containing methane, the C$_2$ hydrocarbons, ethane and ethylene, and the C$_3$ hydrocarbons, propane and propylene, is supplied by line 17 to the bottom of the adsorption zone in vessel 3, at which point the carbon may have a temperature of about 175° F. with the top operated at a moderate pressure of about 1 to 4 atmospheres. This gas passes up through the adsorber section of vessel 3 and all of the C$_3$ hydrocarbons are adsorbed by the time it reaches the top of the section 7. The unadsorbed gases pass out through line 28 or up through hopper 1, as desired, leaving through lines 23 and 27. The temperature of the granular activated adsorbent carbon entering the adsorber from the cooling tubes 4 is about 100 to 120° F. A portion of the unadsorbed gas passing upwardly through the tubes 4 sweeps out any steam being brought down with the hot carbon from the hopper 1 and thus prevents condensation of water on the carbon as it is cooled.

The gases reaching the upper portion of the adsorber 3 above the line 8 are substantially free of C$_3$ and heavier hydrocarbons, hence the carbon entering line 8 contains only adsorbed C$_2$ hydrocarbons and much smaller amounts of methane. This carbon is heated to about 400° F. in heating tubes 11 and a portion of the desorbed gases is permitted to rise upwardly through the rectification zone 35 where it displaces and sweeps upward through line 8 any methane carried into vessel 9 with the carbon. Thus, only C$_2$ hydrocarbons are present in the gas phase at the top of the desorption zone 36 and a side stream of such C$_2$ hydrocarbons of high purity is withdrawn through line 10. The rate of withdrawal of this side stream is proportioned to the rate of carbon passage through vessel 9 so that the C$_2$ hydrocarbons withdrawn represent a fraction, suitably .1 to about .8, of the total C$_2$ hydrocarbons adsorbed on the carbon entering vessel 9. The remaining desorbed C$_2$ hydrocarbons thus constitute an upwardly moving "reflux" countercurrent to the descending carbon in the rectification zone, giving a "reflux ratio" of ascending C$_2$ hydrocarbon gas in line 8 to product withdrawn in line 10, ranging from 9 to .25, although much higher "reflux ratios" may be used if extreme purity of product is desired. A methane-C$_2$ mixture may also be removed by line 13, and additional heating means 14 may be provided for partial desorption in the rectification zone 35. This is especially desirable when operating at low "reflux ratios." Steam or other suitable inert gas may be supplied through line 12 both to aid in stripping the carbon in the heating tubes 12 and also to serve as a gas seal to prevent leakage of other gases through valves 15 and 45.

The carbon passing below the feed 17 in vessel 3 is heated by rising C$_3$ hydrocarbons which are desorbed by heating the carbon in tubes 19 to a temperature of about 400–550° F. and/or stripping it with steam preferably at a similar temperature, supplied by line 20. A portion of the desorbed C$_3$ hydrocarbons is withdrawn in line 18 as the heavy product stream and the remainder passes upwardly through a rectification zone 37 below the feed level to displace C$_2$ and lighter hydrocarbons from the descending carbon. Additional side streams representing one or more intermediate cuts may be withdrawn from vessel 3 above line 18, but these side streams necessarily contain a mixture of C$_2$ and C$_3$ hydrocarbons with larger or smaller amounts of methane, depending upon the point of withdrawal.

Any hydrogen present in the feed gas will be removed along with the methane in lines 28 and 23 in the above-described operation, while C$_4$ and heavier hydrocarbons will be removed along with the C$_3$ hydrocarbons in line 18. The process as described above is also applicable to the treatment of other hydrocarbon mixtures and other gas or vapor mixtures in general containing three or more components of different degrees of adsorption.

Referring to Figure 2, a feed gas mixture containing methane, the C$_2$ hydrocarbons, ethane and ethylene, the C$_3$ hydrocarbons, propane and propylene, and C$_4$ hydrocarbons, including butanes and butenes, is supplied by line 17. The methane and the C$_2$ hydrocarbon cuts are obtained from the top of the adsorber 3 and from the adsorbent side stream vessel 9 as described above in reference to Figure 1. In order to obtain a second intermediate fraction of substantially pure C$_3$ hydrocarbons, the vapor side stream 28 is withdrawn from the tower 3 at a point sufficiently below the feed for this stream to be substantially free of C$_2$ and lighter components. This point is suitably the level at which the C$_3$ hydrocarbons are at their maximum concentration. A lower point of withdrawal than this level may be used, at some expense in capacity, when rigid exclusion of C$_2$ hydrocarbons is desired. Auxiliary heating means 38 may also be provided in the rectification zone 39 above line 28 in order to aid the rejection of C$_2$ hydrocarbons from this zone. The side stream 28 is passed upwardly through the adsorber 29 countercurrent to descending carbon at a temperature of about 175 to 200° F. The carbon and gas flow rates are adjusted to permit substantially complete adsorption of C$_4$ hydrocarbons, leaving substantial proportions of the entering C$_3$ hydrocarbons unadsorbed. These are withdrawn through line 41 in highly concentrated form. The charged carbon, containing adsorbed C$_3$ and C$_4$ hydrocarbons, is passed from adsorber 29 through line 32 to the lower portion of the rectification zone 39 of column 3 where it is mixed with similarly charged carbon descending through valve 33. The carbon is heated in this rectification zone 39 by rising C$_4$ hydrocarbons which are desorbed by heating the carbon in tubes 19 to a temperature of about 400–550° F. and/or by stripping it with steam supplied by line 20. A portion of the desorbed C$_4$ hydrocarbons is withdrawn in line 18 as the heavy product stream and the remainder passes upwardly through the rectification zone 39 to displace C$_3$ and lighter hydrocarbons from the descending carbon.

As before, any hydrogen or other fixed gases present in the feed gas are removed along with the methane in lines 28 and 23 in this operation, while C$_5$ and heavier hydrocarbons are removed along with the C$_4$ hydrocarbons in line 18.

An example of suitable operating conditions for conducting the process as described above, with particular reference to Figure 2, is as follows:

The tower 3 is 12 feet in diameter and 120 feet high between the heating and cooling sections, each of which consists of a vertical tube bundle 20 feet long of adequate area for the heat transfer required. The secondary tower 9 is 40 feet high, including a 20-foot heating tube bundle 11, and is 10 feet in diameter. The third tower 29 is 30 feet high, including a 15-foot cooling tube bundle 30, and is also 10 feet in diameter. Carbon is supplied to the hopper 1 at a rate of 281 tons per hour, 177 tons being diverted through line 8 located at a distance of about 20 feet below line 28. Of the carbon leaving tower 9, 167 tons per hour are returned by line 16 to hopper 1 and 10 tons per hour are passed through tower 29 and returned to the rectification zone of tower 3. 673,000 cubic feet per hour (60° F. and one atm.) of a feed gas described below are supplied through line 17 at 30 p. s. i. g., the columns being operated to take only the necessary pressure drop without disturbance of the steady downward carbon flow in each tower.

Thus, tower 3 is maintained at a top pressure of about 15 p. s. i. g. and a bottom pressure of about 45 p. s. i. g. and towers 9 and 29 are maintained at intermediate pressures. It is important that no hydrocarbon gas be permitted to pass through valve 45 in either direction. This may be accomplished by providing a slightly higher pressure in the bottom of vessel 9 than the top of vessel 29 by means of steam supplied through line 12 so that small amounts of steam pass downwardly with the carbon through valve 45. The coolers and heaters are operated to maintain the carbon leaving cooler 4 at about 120° F. and that leaving cooler 30 at about 150° F. The carbon is heated by heater 11 to about 400° F. and by heater 19 to about 550° F., thus providing a temperature of about 230° F. at the connection with line 18 so that substantially all of the stripping steam supplied by line 20 is withdrawn with heavy product in this line. Under these conditions the temperature at the point of withdrawal of the intermediate cut at line 28 will be about 180° F.

Analyses of an illustrative feed gas mixture and of the product fractions which may be produced when operating under these conditions are as follows:

| Component | Feed Gas (Line 17) | Unabsorbed Gas (Lines 28, 23 and 13) | $C_2$ Cut (Line 10) | $C_3$ Cut (Line 41) | $C_4+$ Cut (Line 18) |
|---|---|---|---|---|---|
| $H_2$ | 10.5 | 24.4 | | | |
| $CH_4$ | 30.4 | 69.9 | 1.0 | | |
| $C_2H_4$ | 9.4 | 2.2 | 27.3 | | |
| $C_2H_6$ | 23.4 | 3.5 | 70.5 | 1.0 | |
| $C_3H_6$ | 7.0 | | 1.1 | 28.9 | |
| $C_3H_8$ | 16.0 | | 0.1 | 69.8 | 1.0 |
| $C_4$ | 1.8 | | | 0.1 | 53.6 |
| $C_5$ | 0.2 | | | | 6.1 |
| $C_6+$ | 1.3 | | | | 39.4 |
| Production: | | | | | |
| ft.³/hr. (×1000) | 673 | 290 | 208 | 154 | |
| gals./hr. | | | | | 640 |

As indicated above, these conditions are designed to produce intermediate cuts, each containing very small amounts of higher boiling olefins. This is especially desirable in concentrating unsaturated hydrocarbon fractions for the production of pure synthetic alcohols as by hydration with sulfuric acid. For example, all propylene is excluded as rigidly as possible from the $C_2$ cut and butenes are similarly excluded from the $C_3$ cut. Even more rigid fractionation may be accomplished by suitably increasing the height of the rectification zones and by operating with higher internal "reflux ratios" in these zones.

This process as described in relation to Figure 2 is also applicable to the treatment of other hydrocarbon mixtures and other gas or vapor mixtures in general containing four or more components of different degrees of adsorption.

It is recognized that all the gas streams described above which are withdrawn from contact with the carbon will contain appreciable quantities of dust or fines and that suitable dust separators are desirably included in such gas lines before the gas is passed through the exit flow control valves. Suitable condensers and separators may also be provided where the gas contains readily condensable constituents such as $C_4$ or heavier hydrocarbons, water vapor and the like. These have been omitted from the drawings for purpose of simplicity.

The operation described above is designed particularly for use with granular particles of the adsorbent which completely fill the vessels described and which, except for the slow, downward motion attending passage through these vessels, undergo no other type of motion. The rising streams of feed and stripping gases or vapors under such cases are held at rates below those causing partial lifting or vibration of the solid particles. Such rates are suitably controlled by maintaining a pressure drop across the bed of solid adsorbent which is less than, and is preferably not more than .5 to .7 times the weight of, the bed expressed in the same units. Higher gas velocities attending pressure drops equal to or slightly greater than the weight of the bed, cause partial lifting and vibration or even intense turbulent motion of the solid particles which resembles that of a boiling liquid. The process can also be conducted with the particles in such vibratory or "fluidized" motion, if suitable baffles or plates represented by the numerals 40 are provided to localize the motion of any particular particle. Using finely divided adsorbent in the form of a powder of about 100–300 mesh, for example, the vessels 3, 9, and 29 can be constructed in the form of ordinary bubble towers, the plates serving to limit the swirling action of the solids to a very small portion of the total height of the column and thus to provide for the necessary overall countercurrent motion of gases and solids which is required for separation of the feed stream into fractions of high purity. Even where such vibratory or fluidized motion is not used throughout the entire columns, it is advantageous in the heating and cooling tubes in order to increase their efficiency, as a slowly moving, non-vibrating solid bed is extremely difficult to heat or cool by indirect means because of its low heat conductivity. The gas velocities causing such vibratory or fluidized motion will vary with the size and density of the solid particles. In general, upward gas velocities below about 1.5 feet per second do not cause such motion with solid adsorbents having a particle size greater than 500 microns and having a bulk density between about 25 and 50 pounds per cubic foot. Upward gas velocities above about two feet per second are sufficient to cause partial lifting of such solid particles, resulting in vibration, the preferred gas velocities for such motion without intensive turbulence being between 2 and 5 feet per second. At higher velocities up to about 15 feet per second the solid particles assume a state of intense turbulence, resembling that of a boiling fluid, but are not completely entrained in the rising gas stream; that is, downward motion of the particles countercurrent to the rising gas stream is still possible. At still higher gas velocities the particles are entrained in the rising gas stream and lifted to such an extent that no substantial downward flow of the particles occurs and countercurrent flow of the solid and gas becomes impossible.

It will be understood that these operating conditions are presented for illustrative purposes and that suitable operating conditions will vary widely with the size and density of the solid material and with the operating temperatures and pressures used. In general, when operating with vibratory or fluidized solids, much larger gas and solid disengaging zones should be supplied than are suitable with non-vibrating solids and larger dust collectors should also be used, with provisions for return of the separated solids to the columns. This may be accomplished by injecting them with a gas stream such as the feed gas or the stripping gases or steam, or by the use of a screw conveyor such as an Archimedian screw.

The above-described processes may be conducted with solid adsorbent particles ranging from about 300 mesh up to about ¼ inch or larger and is preferably conducted with particles that will flow freely through a vertical tube without agitation. It is generally desirable to use particles of fairly uniform size in order to avoid solid segregation or elutriation effects.

The invention is generally applicable to fractionation processes of the type illustrated above, involving selective adsorption of one or more components from a mixture containing other components which are more and less readily adsorbed. In such operations it may be used to separate hydrocarbon mixtures into fractions of any desired boiling range or chemical structure by suitable selection of adsorbents and stripping agents in conformity with chromatographic principles. For example, paraffins, naphthenes, olefins, diolefins and aromatics may be obtained as separate fractions from mixtures of two or more of these classes of hydrocarbons with a silica gel adsorbent used in an adsorption process as described above in one or more stages according to the number of fractions to be separated. Similarly, organic vapors of different degrees of polarity may also be separated by selective adsorption on any suitable solid adsorbents.

While the process has been described above as conducted with a single solid adsorbent, it may also be conducted with mixtures of different types of solid adsorbents designed to supplement each other in accomplishing the separations desired. Thus, a mixture of activated carbon and silica gel may be used for the treatment of moist hydrocarbon gases, the silica gel serving to adsorb the water and to carry it down into the desorption zone while the charcoal serves to adsorb and fractionate the hydrocarbons. Similarly a mixture of activated carbon and solid cuprous chloride may be used in which advantage is taken of the increased adsorption capacity and selectivity of the cuprous chloride when dealing particularly with gases containing olefins and diolefins, and the activated charcoal is used to obtain greater recovery or "clean-up" of the desired hydrocarbons than is possible with the cuprous chloride alone, in view of the relatively high equilibrium partial pressures of the hydrocarbons under ordinary adsorption conditions over their cuprous chloride complexes.

I claim:

1. An improved process for concentrating an intermediate fraction B from a fluid mixture also containing a less readily adsorbed component A and a more readily adsorbed component C by means of a granular solid adsorbent, comprising passing said adsorbent downwardly through a primary column having a primary adsorption zone above the feed and primary rectification and desorption zones below the feed, removing a portion of said descending adsorbent containing components A and B, but substantially free of component C, from said primary adsorption zone at a point substantially above the feed and passing this removed adsorbent downwardly through a secondary column containing secondary rectification and desorption zones, feeding said fluid mixture to the middle of said primary column, removing unadsorbed fluid component A from the top of said primary adsorption zone, removing desorbed component C from the primary desorption zone, removing desorbed component B in a state of high purity from said secondary desorption zone, while passing a portion of desorbed component B upwardly through said secondary rectification zone to displace component A from the descending adsorbent therein.

2. An improved process for concentrating a $C_2$ hydrocarbon fraction from a gas mixture containing $C_1$ to $C_3$ hydrocarbons, comprising passing a granular solid adsorbent downwardly through a primary column having a primary adsorption zone above the feed and a primary desorption zone below the feed, removing a portion of said descending adsorbent containing adsorbed methane and $C_2$ hydrocarbons, but substantially free of $C_3$ hydrocarbons, from said primary adsorption zone at a substantial distance above the feed and passing this removed adsorbent downwardly through a secondary column containing secondary rectification and desorption zones, feeding said gas mixture to the mid portion of said primary column between said primary adsorption and desorption zones, removing unadsorbed methane from the top of said primary adsorption zone, removing desorbed $C_3$ hydrocarbons in a separate stream from said primary desorption zone, removing desorbed $C_2$ hydrocarbons as a separate stream in a state of high purity from said secondary desorption zone, while passing a portion of the desorbed $C_2$ hydrocarbons upwardly through said secondary rectification zone to displace methane from the descending adsorbent therein.

3. Process according to claim 2, in which said feed gas mixture also contains hydrogen which is removed with the unadsorbed methane from the top of said primary adsorption zone.

4. Process according to claim 2, in which said feed gas mixture also contains $C_4$ hydrocarbons which are removed with the desorbed $C_3$ hydrocarbons from said primary desorption zone.

5. Process according to claim 2, in which said feed gas mixture comprises methane, ethane, ethylene, propane and propylene.

6. Process according to claim 2, in which the desorbed solid adsorbent is withdrawn from both of said desorption zones and is returned to the top of said primary column.

7. A process according to claim 2 in which the velocity of the gases rising through the column is sufficient to maintain the adsorbent in a fluidized state.

8. An improved process for concentrating intermediate fractions B and C from a fluid mixture also containing a less readily adsorbed component A and a more readily adsorbed component D by means of a granular solid adsorbent, comprising passing said adsorbent downwardly through a primary column having a primary adsorption zone above the feed and primary rectification and desorption zones below the feed, removing a portion of said descending adsorbent containing components A and B, but substantially free of components C and D, from said primary adsorption zone at a point substantially above the feed and passing this removed adsorbent downwardly through a secondary column containing secondary rectification and desorption zones, feeding said fluid mixture to the middle of said primary column, removing unadsorbed component A from the top of said primary adsorption zone, removing desorbed component B in a state of high purity from said secondary desorption zone while passing a portion of desorbed component B upwardly through said secondary rectification zone to displace component A from the descending adsorbent therein, removing desorbed component D from said primary desorption zone while passing a portion of desorbed component D upwardly through said primary rectification zone to displace component C from the descending adsorbent therein, removing a vapor side stream comprising components C and D and substantially free of components A and B from said primary rectification zone and passing said vapor side stream upwardly through a tertiary column containing an adsorption zone countercurrent to a descending adsorbent which adsorbs component D while leaving a substantial proportion of component C unadsorbed and removing said unadsorbed component C in a state of high purity from the upper portion of said tertiary column.

9. Process according to claim 8 in which the adsorbent leaving the bottom of said tertiary column is returned to said primary rectification zone.

10. Process according to claim 8 in which the desorbed adsorbent leaving the bottom of said secondary desorption zone is supplied to the top of said tertiary column.

11. Process according to claim 8 in which the desorbed adsorbent leaving the bottom of said secondary adsorption zone is supplied to the top of said tertiary column and the charged adsorbent leaving the bottom of said tertiary column is returned to said primary rectification zone.

12. An improved process for separately concentrating $C_2$ and $C_3$ hydrocarbon fractions from a gas mixture containing $C_1$ to $C_4$ hydrocarbons, comprising passing a granular solid adsorbent downwardly through a primary column having a primary adsorption zone above the feed and primary rectification and desorption zones below the feed, removing a portion of said descending adsorbent containing adsorbed methane and $C_2$ hydrocarbons, but substantially free of $C_3$ and $C_4$ hydrocarbons, from said primary adsorption zone at a substantial distance above the feed and passing this removed adsorbent downwardly through a secondary column containing secondary rectification and desorption zones, feeding said gas mixture to the mid portion of said primary column, removing unadsorbed methane from the top of said primary adsorption zone, removing desorbed $C_2$ hydrocarbons as a separate stream in a state of high purity from said secondary desorption zone while passing a portion of the desorbed $C_2$ hydrocarbons upwardly through said secondary rectification zone to displace methane from the descending adsorbent therein, removing desorbed $C_4$ hydrocarbons in a separate stream from said primary desorption zone while passing a portion of the desorbed $C_4$ hydrocarbons upwardly through said primary rectification zone to displace $C_3$ hydrocarbons from the descending adsorbent therein, removing a side stream comprising $C_3$ and $C_4$ hydrocarbons and substantially free of $C_2$ and lighter hydrocarbons from said primary rectification zone and passing it upwardly countercurrent to descending adsorbent in a tertiary column containing an adsorption zone, passing granular solid adsorbent downwardly through said tertiary column to adsorb substantially completely the $C_4$ hydrocarbons supplied thereto while leaving a substantial proportion of the $C_3$ hydrocarbons unadsorbed, removing said unadsorbed $C_3$ hydrocarbons as a separate stream in a state of high purity from said tertiary column.

13. Process according to claim 12 in which the charged adsorbent leaving the lower portion of said tertiary column is passed into said primary rectification zone.

14. Process according to claim 12, in which said feed gas mixture also contains hydrogen which is removed with the unadsorbed methane from the top of said primary adsorption zone.

15. Process according to claim 12, in which said feed gas mixture also contains $C_5$ hydrocarbons which are removed with the desorbed $C_4$ hydrocarbons from said primary desorption zone.

16. Process according to claim 12 in which said feed gas mixture comprises methane, ethane, ethylene, propane, propylene, butanes and butylenes.

17. A process according to claim 11 in which the velocity of the gases rising through the column is sufficient to maintain the adsorbent in a fluidized state.

EDWIN R. GILLILAND.

REFERENCES CITED

The following references are of record in the file of this patent:

UNITED STATES PATENTS

| Number | Name | Date |
| --- | --- | --- |
| 1,422,007 | Soddy | July 23, 1942 |
| 2,335,009 | Holloway | Nov. 23, 1943 |

OTHER REFERENCES

A. I. Ch. E. Transactions, vol. 42, #4, August 25, 1946, pages 665–680. "Hypersorption Process," Clyde H. O. Berg.